United States Patent
Holley

(10) Patent No.: US 8,106,617 B1
(45) Date of Patent: Jan. 31, 2012

(54) MOTOR POWER-MANAGEMENT PROTECTION METHOD AND CIRCUIT

(75) Inventor: Steven E. Holley, Cushing, OK (US)

(73) Assignee: Brunswick Corporation, Lake Forest, IL (US)

( * ) Notice: Subject to any disclaimer, the term of this patent is extended or adjusted under 35 U.S.C. 154(b) by 413 days.

(21) Appl. No.: 12/474,629

(22) Filed: May 29, 2009

(51) Int. Cl.
  *G05B 11/28* (2006.01)
(52) U.S. Cl. .......................... 318/599; 318/811
(58) Field of Classification Search .............. 318/811, 318/599, 364, 366, 445, 449
  See application file for complete search history.

(56) References Cited

U.S. PATENT DOCUMENTS

| | | | |
|---|---|---|---|
| 5,088,943 A * | 2/1992 | Henderson | 440/6 |
| 5,112,256 A * | 5/1992 | Clement | 440/7 |
| 5,171,173 A * | 12/1992 | Henderson et al. | 440/7 |
| 5,179,621 A * | 1/1993 | Nelson, III | 388/811 |
| 5,832,440 A * | 11/1998 | Woodbridge et al. | 704/275 |
| 6,247,980 B1 | 6/2001 | Moore et al. | |
| 6,507,164 B1 | 1/2003 | Healey et al. | |

* cited by examiner

*Primary Examiner* — Rina Duda
(74) *Attorney, Agent, or Firm* — Andrus, Sceales, Starke & Sawall, LLP

(57) ABSTRACT

A power management protection circuit and method provides for a fast, real-time hardware logic control of the power control components of a motor, whereby the over-current condition is an integral of the over-current level and over-current time duration, and provides means for complete turn-off of motor voltage within a few microseconds when a specified energy level has been exceeded or an extended time for the user to take corrective actions if thermal conditions permit. Motor turn-off remains until a snubber diode current has reduced to a safe level even if the stall condition is no longer present. It allows the properties of load-dump current through the snubber diode to drive the protection control logic, and also provides for sensing the temperature of both the snubber diode and the power MOSFET switch. As temperature rises in these power devices, the trolling motor maximum voltage is reduced. Voltage control based on temperature feedback is a hardware function that operates concurrently and independently from the over-current sensing and voltage turn-off.

24 Claims, 4 Drawing Sheets

MOTOR POWER-MANAGEMENT PROTECTION METHOD AND CIRCUIT

FIELD

The present application is directed to the field of trolling motors. More specifically, the present application is directed to the field of stalled-motor power-management circuit design in trolling motors.

BACKGROUND

In general, when a trolling motor is stalled due to prop entanglement or other prop disruptions that slow or stop shaft rotation, then motor surge-currents, excess sustained currents, and over-heating of all main current components can cause partial to total failure of various system components and put the trolling motor at risk for unwanted operations and/or the possibility of fire.

When corrective means are applied to an intermittent stalled motor over-current condition, then a secondary response time problem is presented. If the corrective system is too fast then intermittent stalls will create an undesirable intermittent operation, but if the corrective system is too slow then locked rotor stalls can quickly overcome the system with damage.

Existing motor protection methods either regulate the current to a maximum value or shuts off the entire system like a circuit breaker which requires a total power up sequence. Methods that regulate stall current to a safe level for the electronics is still not safe for the user since the motor will immediately start turning when the user frees the obstruction from the prop that has the motor in the stall condition. When the prop starts turning immediately then the user is at risk for injury. The method that shuts everything off and requires power-up is safe but a very unnecessary nuisance.

The existing motor protection solutions are typically fixed at detecting stalled conditions at 100% voltage, similar to a circuit breaker configuration, wherein a stalled condition that occurs at 50% voltage or 75% voltage or any other percentage of voltage would not be detected properly. As an example, if a motor is operating at 50% of the pulse width modulation (PWM) signal voltage and the motor of the trolling motor is wound up in a weed or other obstruction, a user is only protected if the motor is operating at 100% PWM. In the case of this example, a user may raise the motor up, remove the weeds from the motor, and because the motor was only operating at 50% PWM, there is a good chance that the motor starts up while the user is removing the weeds from the motor, as the obstruction in this case would not trip a circuit fixed at 100% PWM. What is needed then is a proportional reference, and not a fixed reference in such a circuit.

SUMMARY

The circuit and method of the present application provides for a fast, real-time hardware logic control of the power control components whereby the over-current condition is an integral of the over-current level and over-current time duration. The circuit and method of the present application provides means for complete turn-off of motor voltage within a few microseconds when a specified energy level has been exceeded or an extended time for the user to take corrective actions if thermal conditions permit. Motor turn-off remains until snubber diode current has reduced to a safe level even if the stall condition is no longer present. It allows the properties of load-dump current through the snubber diode to drive the protection control logic, and also provides for sensing the temperature of both the snubber diode and the power MOSFET switch. As temperature rises in these power devices, the trolling motor maximum voltage is reduced. Voltage control based on temperature feedback is a hardware function that operates concurrently and independently from the over-current sensing and voltage turn-off.

DETAILED DESCRIPTION

Figure 1A:
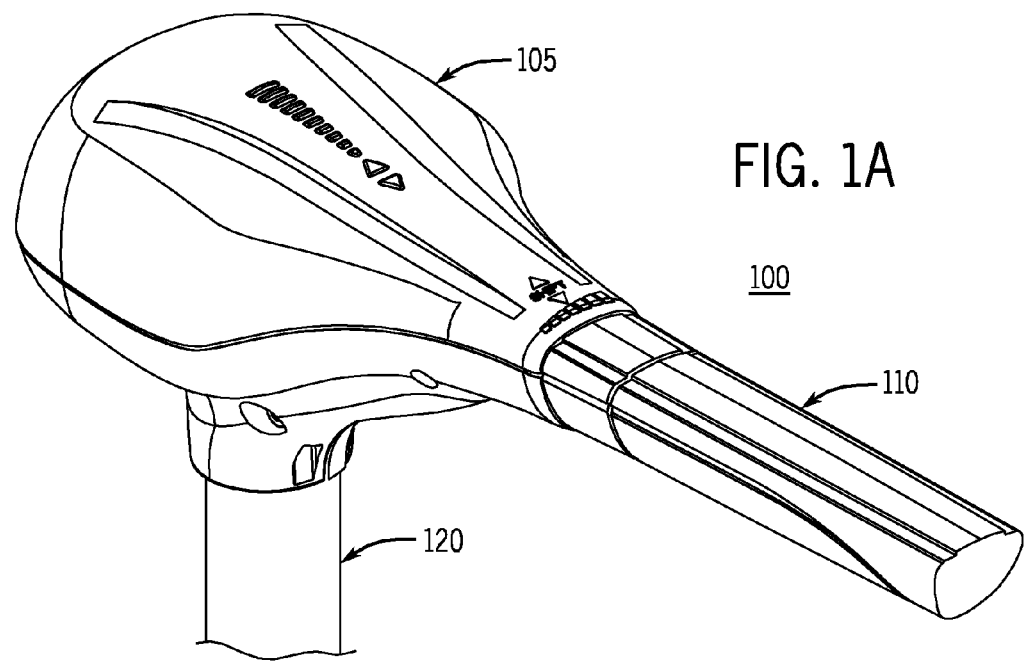
FIGS. 1A and 1B are graphical representations illustrating a tolling motor head assembly incorporating an embodiment of the present application; and, FIGS. 2A and 2B are schematic diagrams illustrating an embodiment of the protection circuits of the present applications.
Figure 1B:
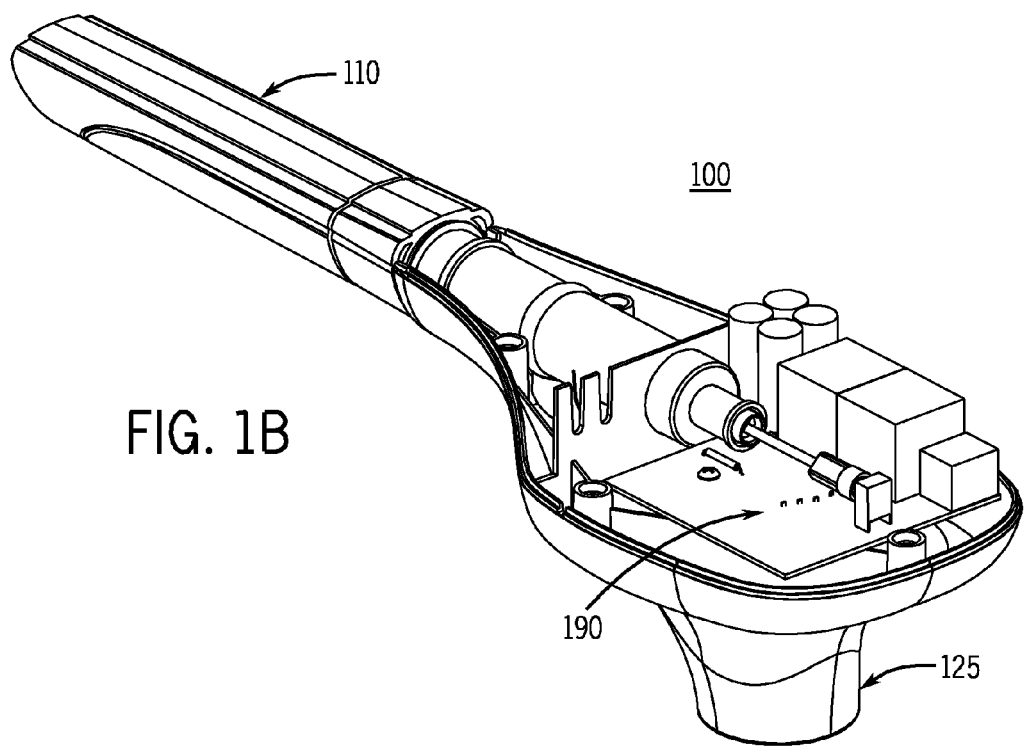

Referring to FIG. 1A, a controller head assembly 100 according to an embodiment of the present application is illustrated. Here, the controller head assembly includes a controller head cover 105, a throttle handle 110 and a motor column 120 leading to the trolling motor unit (not shown). FIG. 1B illustrates the controller head assembly 100 with the controller head cover 105 removed. Again, the throttle handle 110 provides the user with a steering, throttle and directional control of the trolling motor, and the column cover 125 protects the junction between the motor column 120 and the controller head assembly 100. In FIG. 1B, a controller board 190 is illustrated, and this is preferably where the circuit of the present application is physically located. Of course it will be known to one skilled in the art that several of the connections and components listed and illustrated in the following schematic diagrams will be physically located in other parts of the trolling motor, but the majority of the circuit components will be located on the controller board 190. It should also be noted that the controller board 190 may be better utilized physically in other spaces of the controller head assembly 100 or in other portions of the trolling motor system generally.

The present invention uses the voltage drop in the main power switching device as an indication of current through the main power switching device and therefore through the motor. It should be noted that the main power switching device is a MOSFET or power MOSFET in a preferred embodiment, but it is understood that an insulated gate bi-polar transistor (IGBT) or any other power switching device may be used. For the purpose of discussion, the preferred MOSFET device will be used throughout the specification. Since Pulse Width Modulator (PWM) switching is taking place with the MOSFET, it is not generally considered a current sensor as well. The actual current is also a function of the PWM waveform which varies with duty cycle and distortions from MOSFET rise and fall times. In the present application, the MOSFET drain to source voltage is sampled in synchronization with the PWM gate voltage on the MOSFET and also corrected for rise and fall time that distort the representation. The circuit of the present application also takes advantage of the fact that MOSFET on resistance will increase slightly with increased temperature. Since increased resistance is proportional to temperature, the sensing is more sensitive under conditions that require more sensitivity—that is higher current results in higher temperature which results in higher resistance which results in higher voltage representing the current.

Figure 2A:
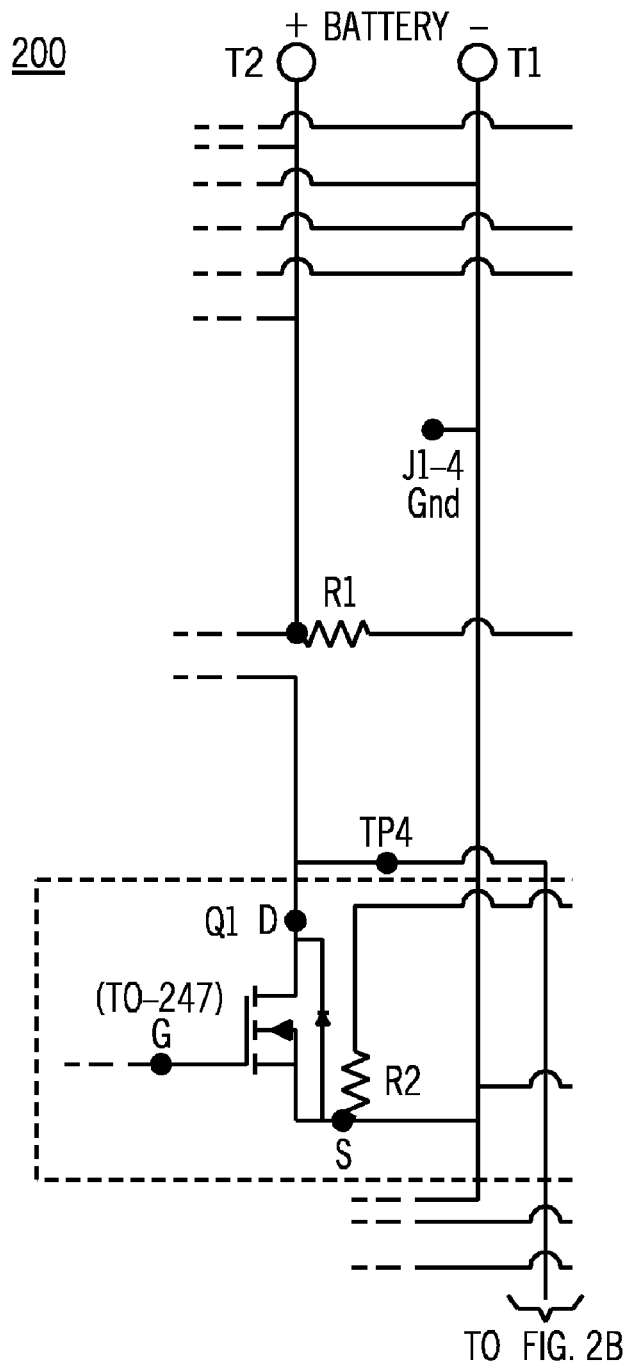
Figure 2B:
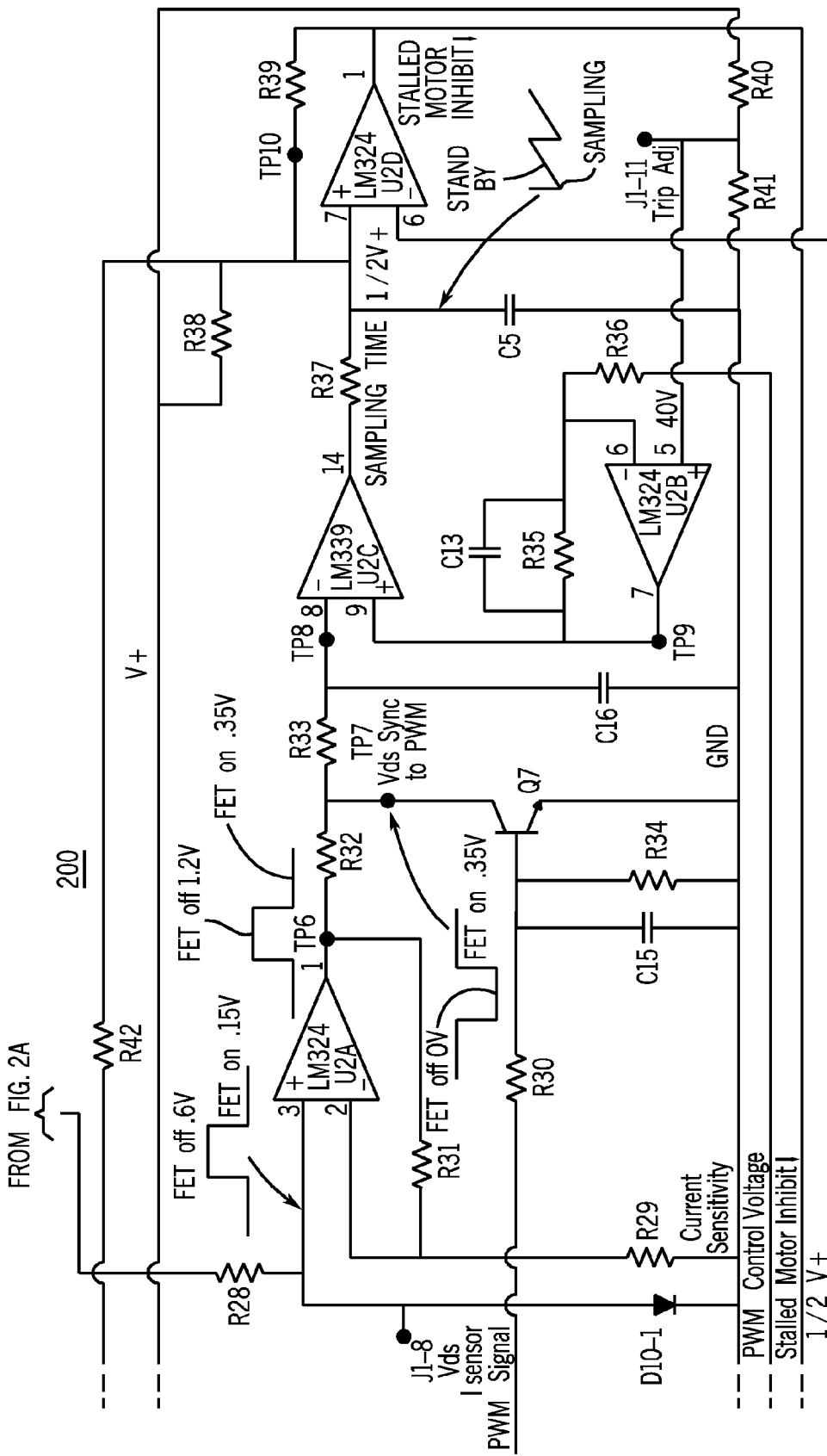

Over-current is measured by sensing the voltage drop across the drain-to-source resistance of the power MOSFET switch. FIGS. 2a and 2b illustrates this with a very low level voltage sample that is the input 3 to an amplifier U2A that increases the amplitude. The open switch voltage of the MOSFET is extremely large compared to the closed switch voltage and would overdrive the amplifier U2A but diode D10 clamps the input to the diode forward voltage drop. Output of the U2A amplifier in FIG. 2b is gated with the PWM to synchronize and extract the actual current signal from the more complex signal combination of on, off, and transient switching signals sampled from the MOSFET. A propagation delay circuit of R30, R34, and C15 prevent the gating transistor Q7 from responding to PWM transition errors that would distort the true current.

R33 and C16 form an integrator to measure the rise in energy represented by the over-current condition. The over-current energy comparator U2C initiates a sampling time delay when the energy level reaches a specified level. Once the sampling time is exceeded then the PWM is turned off by the second U2C comparator and initiates a standby time delay. During the standby delay, the trolling motor will remain off even if the over-current condition is remedied. The user is required to return the throttle control which determines the PWM control voltage to the motor off level in order to reset the standby mode. If the stalled current condition is remedied then the motor operation will continue normally but if the stalled current condition remains then the standby mode will be re-entered immediately.

The integrating circuit R33, C16 provides a sampling time window which allows the prop to strike objects that produce transient over-current condition without starting the standby delay. The standby delay allows the snubber diode D10 current to diminish due to the motor inductance load-dump to a safe thermal level.

FIG. 2 also contains the temperature control circuit of which the present invention includes for total power management. Thermistors located on the power MOSFET and snubber diode are connected with R43, R44, R345, and R46 in the form of a wheatstone bridge for the comparator LM339. Either of the thermistors can unbalance the wheatstone bridge due to excessive heat and once the comparator level is exceeded then the comparator output turns on the PWM suppression switch Q8 and cuts back the trolling motor voltage within microseconds. This thermal protection operates concurrently and independently with the over-current protection.

Restating some of the disclosure above, and providing additional detail, FIGS. 2A and 2B illustrate a power management protection circuit 200 of the present application. This power management protection circuit 200 is coupled with a battery at terminals T1 and T2, and provides power management protection to the trolling motor circuit (not shown). The MOSFET Q1 provides the sample signal when it is conducting, that is when voltage from the drain D of Q1 is conducting the MOSFET Q1 is being utilized as a current sensor. This is effectuated in that the drain D voltage comes down to resistor R28, and the current associated with this voltage is inputted into the U2A amplifier. Preferably, this amplifier U2A has a gain of 2.3. However, amplifiers of various gain may be used to increase the signal to noise ratio of the inputted drain voltage. The forward voltage drop of the diode D10 is approximately and preferably 0.6 volts. Therefore, when sampling the MOSFET voltage, when the MOSFET turns off the voltage going into the amplifier U2A can only rise to a 0.6 volt level of the diode D10 and when the MOSFET turns on, the voltage is approximately 0.1 volts.

At the output 1 of the amplifier U2A, a voltage divider circuit including resistor R32, resistor R33 and transistor Q7 having an output of the collector of the transistor Q7. This voltage divider behaves very much like a switch such that when the MOSFET is conducting and the voltage into the amplifier U2A is 0.1, the voltage out of the voltage divider circuit will be approximately 0.25 volts, and when the MOSFET is turned off and the voltage into the off amp U2A goes to 0.6 volts thus saturating the amplifier U2A, the transistor Q7 actually turns off. This voltage divider circuit or switch is then synchronized with resistor R30 that provides an inverted PWM signal, such that the switch is synchronized with the PWM control voltage of the MOSFET Q1. Accordingly, then when Q1 is turned on, the switch is turned off, and when Q1 is turned off, the switch is turned on. The switch signal output of Q7 will then have a peak representing the current translated non-resistive MOSFET Q1 voltage. Because the switching characteristics of the MOSFET Q1 are not perfect, a delay circuit including capacitor C15 and resistor R34 are implemented to account for the MOSFET Q1 delay. This delay circuit will delay the control signal so that it simulates the delay that is taking place in the MOSFET Q1. After this delay circuit is implemented, a square wave is outputted with a varying duty cycle that varies with the PWM and the peak value.

Still referring to FIGS. 2a and 2b, an integrator circuit including resistor R33 and capacitor C16 averages this square wave outputted from the delay circuit above. It is this average wave from the integrator circuit that is compared to a reference voltage to determine whether the circuit 200 trips, and this occurs when the average value wave exceeds the reference voltage. However it should be noted that a time component is also incorporated into this determination and will be discussed further below. The reference voltage is derived from the PWM control voltage over resistor R36 which adjusts the fixed voltage over resistors R40 and 41. Adding these two voltages creates a variable reference that is the highest referenced voltage. The averaged wave must achieve this highest over current before it trips. If the motor is dropped to a lower speed and the PWM decreases, the average voltage to the motor is lower, and thus the PWM control voltage modifying the fixed voltage over R40 and R41 is also lower. This lower PWM control voltage then lowers the reference, thus creating a variable reference.

When the average wave voltage is higher than the reference voltage, the output of U2C connected to the resistor R37 will go low and begins discharging the capacitor C5. This creates a delay, such that it provides an amount of time that the over current condition exists before the circuit 200 will trip. In other words, first the comparison determines whether the average signal is greater than the reference voltage, and then this over current condition must occur for a predetermined amount of time. In a preferred embodiment, this delay should occur for a half of a second, but may be adjusted to a user's specification. This delay circuit that determines this time includes resistor R37 and capacitor C5. If the over current condition is remedied prior to the discharge of capacitor C5, then the circuit will not trip, and normal operating will proceed. If the delay ends and the circuit is still in overload then the operational amplifier U2D will trip and the output of this amplifier U2D will stop the PWM, thus stopping the transistor Q7. This creates a situation where the PWM is on but not modulating the MOSFET Q1, and the circuit is still looking for the voltage signal from the MOSFET Q1. This creates a latched condition for the MOSFET Q1 until the PWM voltage is returned to zero. Once this occurs, then the circuit is re-set and once throttle is returned to the circuit, the normal operation will proceed.

Lastly, a recovery circuit including resistor R38 and capacitor C5 provides a delay time from which the throttle must be turn to the off position before it can be turned back on to effectuate normal throttle and circuit 200 operation. Preferably this recovery time is one second, but can be adjusted by adjusting the values of R38 and C5.

Figure 3:
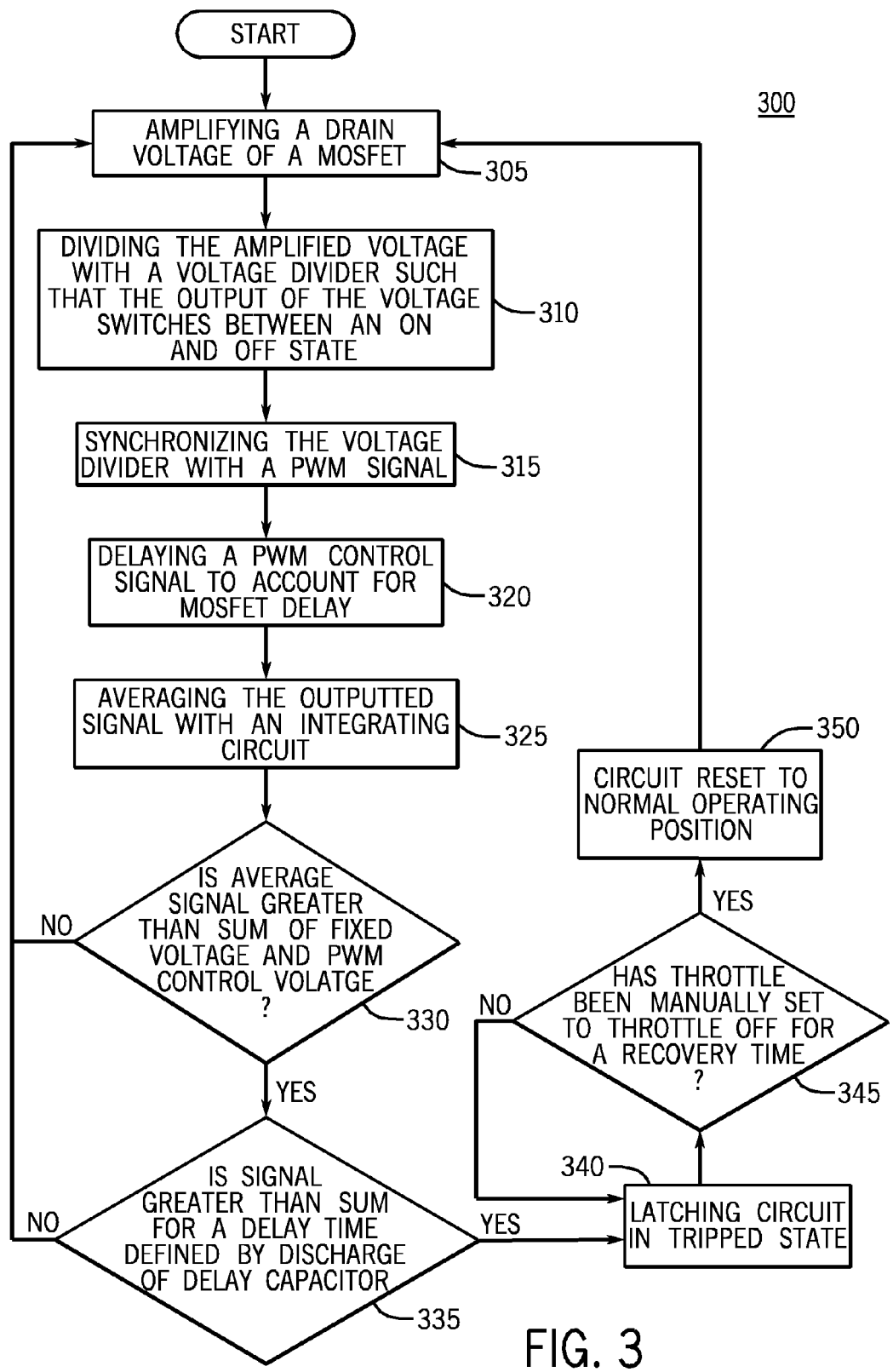
FIG. 3 is a flow chart illustrating a method according to an embodiment of the present application

A method 300 of power management protection for a trolling is illustrated in the flow chart in FIG. 3. In step 305, a drain voltage of a MOSFET in the above-referenced circuit is amplified, and in step 310 the amplified voltage is divided with a voltage divider such that the output of the voltage switches between an on and off state. As discussed above, the voltage divider of the present method and system acts as a switch in this fashion. In step 315, the voltage divider synchronized with a PWM signal, and in step 320 a PWM control signal is delayed to account for the MOSFET delay. This synchronizing step 315 ensures that when the MOSFET is turned on, the switch is turned off, and when the MOSFET is turned off, the switch is in an on position. The delaying step 320 transforms the output of the amplifier such that the signal is now a square wave of varying duty cycle that varies with the PWM and the peak value. In step 325, this outputted signal is then averaged with an integrating circuit, such that the square wave is transformed into an average value signal of the previous square wave. This averaged wave is now compared to a variable reference signal in steps 330 and 335. Here, if the average signal is greater than the sum of a fixed voltage and the PWM control voltage for a predetermined delay time defined by the discharge of the delay capacitor, then the circuit is latched in a trip state in step 340. If one of the first two conditions of steps 330 and 335 are not met, then the circuit continues normal operation in step 305. Referring back to step 340, if the throttle has been manually set to throttle off for a predetermined recovery time in step 345, then the circuit is reset to a normal operating position in step 350 and the method reverts back to step 305. As can be seen with respect to steps 340 and 345, if the throttle is not set to throttle off for this recovery time, then the circuit remains latched in step 340.

It should also be noted that the resistance of the MOSFET Q1 increases when the temperature of the MOSFET Q1 increases, occurring naturally in normal operation. When the circuit 200 operates and the resistance increases, a voltage value is produced that creates a higher current condition that then causes the over current circuit 200 as described above to trip sooner than if such a MOSFET Q1 were not used for this purpose. This provides an extra safeguard to safe operation of the trolling motor.

What is claimed is:

1. A power management protection circuit for a trolling motor, the circuit comprising:
    a first operational amplifier receiving a voltage from a power switching device and amplifying the voltage;
    a voltage divider receiving the amplified voltage from the first operational amplifier and turning off a switch signal output of the voltage divider when the voltage has a high value;
    an integrator circuit receiving the switch signal and outputting an averaged voltage signal;
    a comparator receiving the averaged voltage signal and comparing the averaged voltage signal to a variable reference signal;
    a discharge circuit providing a predetermined time delay when the averaged signal is greater than the variable reference signal,
    wherein when the time delay ends and the averaged signal remains greater than the variable reference signal for the duration of the time delay, the power switching device is turned off, and
    further wherein when the averaged signal becomes less than the variable reference during the time delay, the time delay is interrupted, and the power switching device is turned on; and
    a throttle control, wherein setting the throttle control to an off position resets the turned off power switching device.

2. The circuit of claim 1, further comprising a diode electrically coupled with the operational amplifier, the diode limiting the voltage entering the operational amplifier.

3. The circuit of claim 1, wherein the voltage divider includes a first and second resister electrically coupled in series, and a common node of the resistors coupled to a collector of a switching transistor.

4. The circuit of claim 3, further comprising a synchronizing resistor electrically coupled with a base of the switching transistor, the synchronizing resistor providing an inverted power width modulated (PWM) signal to the base, thus synchronizing the switching transistor with a PWM control voltage of the power switching device.

5. The circuit of claim 4, wherein the switch signal includes a peak representing a current translated nonresistive power switching device voltage.

6. The circuit of claim 5, further comprising a delay circuit including a delay circuit capacitor and a delay circuit resistor, the delay circuit capacitor and the delay circuit resistor electrically coupled in parallel from a base of the switching transistor to ground, wherein the delay circuit modifies the switch circuit by delaying the PWM control signal to account for power switching device delay.

7. The circuit of claim 3, wherein the integrator circuit includes the second resistor and an integrator circuit capacitor electrically coupled in parallel with the switching transistor.

8. The circuit of claim 1, wherein the comparator is a second operational amplifier.

9. The circuit of claim 4, wherein the variable reference signal includes a fixed voltage component and the PWM control signal.

10. The circuit of claim 1, wherein the discharge circuit includes a discharge circuit capacitor and a discharge circuit resistor electrically coupled to the output of the comparator.

11. The circuit of claim 1, further comprising a recovery circuit, wherein the recovery circuit requires the throttle control to be set to the off position for a predetermined amount of time before resetting the power switching device.

12. The circuit of claim 1, wherein heat generated by the power switching device increases the voltage.

13. The circuit of claim 1, wherein the power switching device is a MOSFET and the voltage amplified from the MOSFET is a drain voltage of the MOSFET.

14. A method of power management protection for a trolling motor, the method comprising:
    amplifying a drain voltage of a MOSFET;
    dividing the amplified voltage with a voltage divider such than an output of the voltage divider switches between an on and an off state;
    synchronizing the voltage divider with a PWM signal;
    delaying a PWM control signal to account for the MOSFET delay;
    averaging an outputted signal with an integrating circuit;

comparing the averaged signal to a variable reference signal for a predetermined discharge time, and latching the MOSFET in a trip state when the averaged signal is greater than the variable reference signal for the predetermined discharge time; and resetting the MOSFET when a throttle control is set to an off position.

15. The method of claim 14, further comprising limiting the drain voltage entering the first operational amplifier with a diode electrically coupled with the operational amplifier.

16. The method of claim 14, wherein the dividing step is carried out by a voltage divider, the voltage divider including a first and second resistor electrically coupled in series and a common node of the resistors coupled to a collector of a switching transistor.

17. The method of claim 16, wherein the synchronizing step is carried out by a synchronizing resistor electrically coupled with a base of the switching transistor.

18. The method of claim 16, wherein the delaying step is carried out by a delay circuit, the delay circuit including a delay circuit capacitor and a delay circuit resistor, the delay circuit capacitor electrically coupled and parallel from a base of the switching transistor to ground.

19. The method of claim 16, wherein the averaging step is carried out by an integrator circuit, the integrator circuit including the second resistor and an integrator circuit capacitor electrically coupled in parallel with the switching transistor.

20. The method of claim 15, wherein the comparing step is carried out by a second operational amplifier.

21. The method of claim 15, wherein the variable reference signal includes a fixed voltage component and the PWM control signal.

22. The method of claim 20, wherein the discharge time is carried out by a discharge circuit, the discharge circuit including a discharge circuit capacitor and a discharge circuit resistor electrically coupled to the output of the second operational amplifier.

23. The method of claim 15, further comprising preventing the MOSFET from resetting after the throttle control is set to the off position for a predetermined amount of time with a recovery circuit.

24. A power management protection circuit for a trolling motor, the circuit comprising:
    a voltage divider receiving an amplified drain voltage and outputting a square wave switch signal, and turning off a switch signal output of the voltage divider when the drain voltage has a high value;
    an integrator circuit receiving the switch signal and outputting an averaged voltage signal;
    a comparator receiving the averaged voltage signal and comparing the average voltage signal to a variable reference signal;
    a discharge circuit providing a predetermined time delay when the averaged signal is greater than the variable reference signal,
    wherein the MOSFET is turned off when the averaged signal is greater than the variable reference signal for the duration of the time delay;
    a throttle control, wherein setting the throttle control to an off position resets the turned off MOSFET; and
    a recovery circuit, wherein the recovery circuit requires the throttle control to be set to the off position for a predetermined amount of time before resetting the MOSFET.

* * * * *